Sept. 25, 1951  R. H. HELLWIG  2,569,168
SPRING SUSPENSION FOR VEHICLES
Filed Aug. 19, 1949

Inventor

Rudolph H. Hellwig

By
*Attorneys*

Patented Sept. 25, 1951

2,569,168

UNITED STATES PATENT OFFICE 2,569,168

SPRING SUSPENSION FOR VEHICLES

Rudolph H. Hellwig, Sun Valley, Calif., assignor of twenty per cent to Cameron B. Aikens, Los Angeles, Calif.

Application August 19, 1949, Serial No. 111,300

5 Claims. (Cl. 267—15)

This invention relates to certain new and useful improvements in vehicle spring suspensions which are used to yieldingly and operatively connect wheel-equipped axles to a superposed chassis frame.

The principal object of the invention is to structurally, functionally and otherwise improve upon prior art suspensions through the adoption and use of mechanical expedients which, while individually old, are assembled and appropriately coordinated in a novel manner to thus provide an advanced assemblage capable of attaining greater strength, efficiency, simplicity and, what is more important, an appreciable reduction in productive costs.

Keeping in mind the all important factor of safety requirements, I utilize a sturdily built torque lever or arm and hingedly attach its inward end to a heavy-duty bracket rigid on the complemental chassis frame member, the outward end to the axle and, with assistive single leaf springs which are associated with the axle, frame member and lever, cant the latter so that it provides an axle brace. Above the vertically swingable end of the lever a cushioning bumper is permanently affixed to the frame member. Therefore, if either of the two leaf springs break, the lever, under the load imposed, will snap against said bumper and continue to function—temporarily, of course—until necessary repairs may be made. Consequently, the safety of the riders will be reasonably assured.

With spring suspensions commonly employed, the wheels are often seen to go out of normal positions, relative to chassis, and this so-called "wheel spreading" is objectionable, inasmuch as the condition causes irregular tire wear which, in turn, interferes greatly with reliable steering control. Therefore, it is an object of this invention to provide greater stability and the avoidance of wheel spreading.

Spring suspensions are, as is well known, placed under great stress and strain when swaying vehicles negotiate certain road turns and curves. So, in carrying out the principles of my improved construction, I take the situation into account. Consequently, it is a further objective to provide a more satisfactory spring suspension system wherein the spring suspensions for all four wheels contribute their proportionate shares in promoting better balance, restrained functioning and stabilized equilibrium.

Then, too, the prerequisites of uniformity of resilient responsiveness, counteracted with good shock absorbing properties, is a matter of significance. So here, too, I have evolved and perfected a highly practical spring suspension structure in which manufacturers and users will find their needs fully met, contained and at all times available.

Briefly, the suspension assembly for each wheel, both front and rear wheels, is the same, and each assembly is characterized by a torque lever or arm which is interposed between the overlying frame member and underlying wheel-supported axle and is fixedly bracketed and hinged at one end to the frame member so that its outwardly projecting end is swingable in a vertical plane toward and from said frame member, the last-named end of the lever being preferably fixed, but not necessarily so, to said axle. An emergency cushioned bumper or buffer is fixed on the under side of said frame member in the path of swing of the swingable end of the lever. A primary single leaf spring is attached at its outward or forward end to said axle and hingedly and adjustably anchored at its inward end on the frame member in a manner to underlie, in substantial parallelism, the torque lever. A secondary or rebound spring is attached at one end to the axle, preferably by way of the lever, and has its opposite or outward end adjustably shackled on the corresponding end of the frame member. Thus, two adjustable single leaf springs conjointly distribute stresses and strains in a manner to satisfactorily complete the overall spring suspension.

Objects and advantages, in addition to those enumerated, will become apparent from the following description and the accompanying drawing.

In the accompanying sheet of drawings, wherein like numerals are employed to designate like parts throughout the views.

Figure 2:
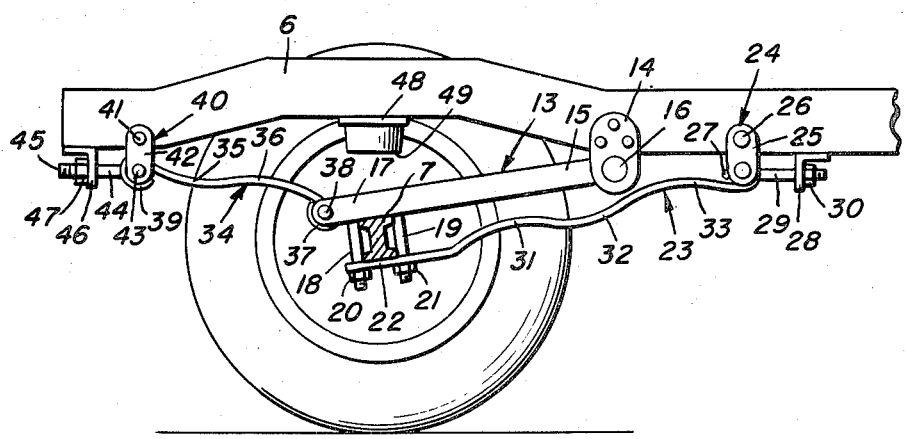
Fig. 2 is an enlarged fragmentary sectional and elevational view taken on the line 2—2 of Fig. 1 looking in the direction of the arrows.

Referring now to the drawing by reference numerals and accompanying lead lines, one chassis frame member is denoted by the numeral 5 and the other complemental frame member by the numeral 6, and these are supported above a front axle 7 and rear axle structure 8 by my improved spring assemblies, one of which is detailed in Fig. 2. The front axle carries complemental wheels 9 and 10 and the rear axle is provided with customary wheels 11 and 12.

Since each spring assembly is the same in construction, a description of one will suffice for all. Reference is therefore had to Fig. 2, wherein the stated torque lever or arm, which is linearly straight and rigid, is denoted by the numeral 13. Heavy-duty brackets 14 are rigidly secured to the frame member. The inward end 15 of the lever is hinged, at 16, between the complemental brackets 14, allowing the outward end 17 of the lever to swing toward and from the frame member 6 in a vertical plane by way of the horizontal axis 16. End 17 of the lever preferably projects forwardly beyond the axle where it is secured by rigid studs 18 and 19 on the axle. Assembling and retaining nuts 20 and 21 are provided on the screw-threaded ends of the studs. These same studs and nuts serve to rigidly clamp the corresponding forward end portion 22 of the primary single leaf spring 23 to the axle. Spring 23 is preferably of a length greater than the lever and projects inwardly of the brackets 14 where it is anchored by a shackle 24 to the frame member. The links 25 of the shackles are hingedly attached at 26 to the frame member and the hooked end portion 27 is pinned between said links. An angle clip 28 is fixed on the under side of the frame member and serves to accommodate a spring adjusting bolt 29 which is connected with the hooked end portion 27 at one end and has its opposite screw-threaded end adjustably mounted in the clip 28 by way of an adjusting and retaining nut 30. The spring is a double compound or undulated leaf spring whose several bends, which are bowed longitudinally, are denoted by the numerals 31, 32 and 33. The size and strength of this spring will vary according to ever-changing requirements and in relation to the weight of the vehicle, size of frame and wheel supported axle. It will be understood, therefore, that my drawings are primarily pictorial and illustrative in character.

The secondary or rebound and shock-absorbing spring is denoted by the numeral 34 and this is a shorter spring which is of a compound character and has undulations or bends 35 and 36. The inward end 37 of said spring is pivotally connected at 38 to the coacting end of the lever, in any suitable manner. The outward end of said spring 39 is pivotally and adjustably anchored by way of a shackle 40 to the adjacent end of the frame member. The links of the shackle are pivoted on the frame member as at 41, said links being denoted by the numerals 42. The connection between the links and spring is also a pivotal connection as at 43. A bolt or stud 44 is integrally joined with the end 39 of the spring and the opposite screw-threaded end 45 is adjustably mounted in an angle bracket or clip 46 rigidly attached to the frame member, said screw-threaded end being provided with an adjusting and assembling nut 47.

The numeral 48 designates a suitable base which carries a rubber or equivalent buffer block 49. The block 49 is in the path of swing of the end 17 of lever 13.

Figure 1:
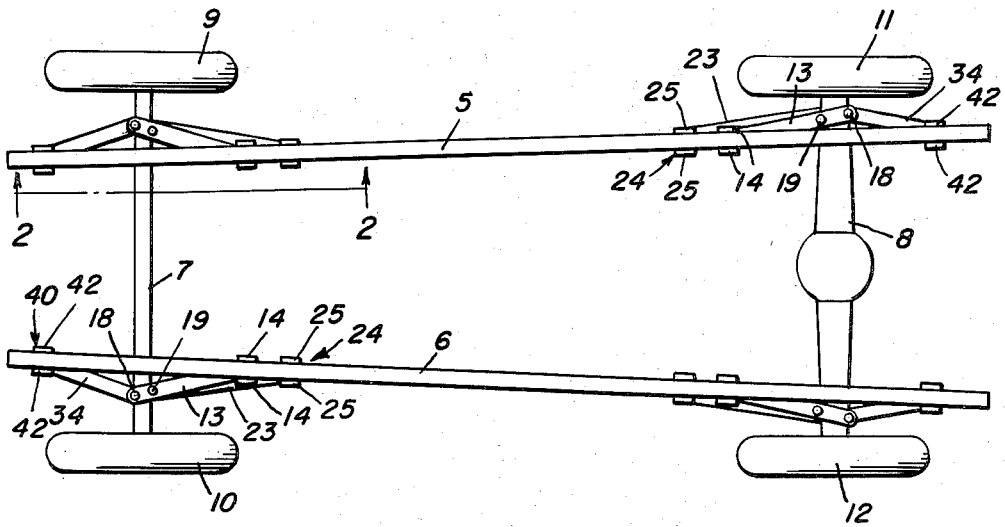
Fig. 1 is a top plan view of a wheel and axle-supported vehicle chassis equipped with my improved spring suspension assemblies.

Referring to Fig. 1, it will be seen that the torque lever 13 is not only normally angled or canted in a forward and downward direction (see Fig. 2), but projects at an acute angle outwardly and beyond the adjacent frame member. It is within the purview of this invention to thus angularly position the lever and springs 23 and 34; or, all of the parts may be in superposed alignment and directly beneath the frame member. When the parts are mounted in the projecting angular relationship seen in Figure 1, they coact in affording a more satisfactory bracing action for the chassis and wheel-supported axles, as is obvious. The inherent resiliency of the springs may be determined and established by the curvate bends or undulations and, in addition, by the length, cross-section and character of steel which is utilized. Then, too, the "give" and "take" properties will be determined by the length of the torque lever. For example, by using a shorter torque lever and a longer main or primary spring 23, the lifting power will be increased. The secondary or shock-absorbing and rebound spring can be mounted in the position and manner shown by attaching it pivotally to the forward end of the torque lever, or it may be attached directly (not shown) to the axle. It is also within the spirit of the invention to hingedly mount both ends of the main or primary spring 23.

It will be evident that the spring properties and sensitivity of control of the two springs 23 and 34 may be properly set and controlled by way of the respective nut adjusted studs or bolts 29 and 44 respectively. These bolts swing or adjust the shackles 24 and 40 thus making it possible to cradle the respective outer ends 27 and 39 of the springs at points closer to or farther from each other.

Speaking in terms of generalities, when the wheel supported axle 7 moves down and thus away from the chassis frame, the end 17 of the torque lever also swings down on its pivot point 16 with the result that both springs 23 and 34 are brought into play and move to "open" positions. With the load thus applied, spring 23 is both flexed to properly and yieldingly resist the down travel of the stated axle. At the same time, the load is applied at the junctural connections 37 and 38 between the spring 34 and lever 13 so that with the load thus applied, the bends 35 and 36 tend to straighten out and the endwise pull stresses and thus tensions said spring 34. Spring 34 is now set to function as the aforementioned shock absorbing and rebound control. When the axle 7 rebounds, the spring 23 is then alternately stressed, tensioned and flexed and the bends 31, 32 and 33 are straightened out. It follows that the two springs operate in proper coordination and sequence to "open" and "close" with requisite united actions in order to bring about the desired spring suspension results.

If either or both springs 23 and 34 snap and break, the lever 13 still remains to connect the wheel assembly to the chassis and the bumper block 49 comes into play to serve as a temporary "spring" in an obvious fashion.

I shall not attempt to visualize and describe the various relative positions of parts when in active use or to otherwise theorize on scientific principles. It is sufficient, I believe, to state that a spring suspension made and constructed in accordance with the illustrated combination in Fig. 2 will attain the desired results of satisfactory riding comfort and an appreciable saving in costs to manufacturers and purchasers.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a wheel and axle suspension of the class shown and described, in combination, a horizontally disposed frame member, a wheel-supported axle underlying and being at right angles to said frame member, a rigid torque lever interposed between said frame member and said axle and hinged at one end to a bracket fixed on said member and swingable toward and from said member, means fixedly securing the other end of said lever to said axle, a cushioned bumper interposed between said frame member and lever and fixed on said frame member in the path of swing of said lever, and a pair of individual primary and secondary single leaf springs connected at adjacent corresponding ends to said axle and at opposite remote ends to said frame member.

2. In a wheel and axle suspension of the class shown and described, in combination, a horizontal frame member, a wheel-supported axle, the latter underlying and being at right angles to said frame member, a torque lever interposed between said member and said axle and hinged at one end to an anchoring bracket fixed on said member and swingable toward and from said member, means fixedly securing the other end of said lever to said axle, a cushioned bumper fixed on said frame member in the path of swing of said lever, a primary leaf spring opposed to and paralleling said lever and rigidly secured at one end to said axle, a shackle, means adjustably securing said shackle to said frame member, the opposite end of said spring being hinged to said shackle, and a secondary leaf spring having means securing it at one end to said frame member and attached at its opposite end to said lever.

3. In a wheel and axle suspension of the class shown and described, in combination, a horizontal frame member, a wheel-supported axle underlying and at right angles to said frame member, a bracket secured rigidly on said frame member, a torque lever interposed between said member and said axle and hinged at one end to said bracket, the opposite end of said lever being swingable toward and from said frame member, means fixedly securing the last named end of said lever to said axle, a single leaf spring opposed in approximately parallelism to said lever and secured at one end to said axle, and means for pivotally and adjustably shackling the opposite end of said spring to said frame member.

4. In a spring suspension for vehicles of the class shown and described, in combination, a horizontal frame member, a wheel supported axle underlying and at right angles to said frame member, a bracket rigidly mounted on said frame member, a torque lever interposed between said frame member and said axle and hingedly mounted at one end to said bracket, the opposite end of said lever being secured to but projecting beyond said axle and being movable toward and from said frame member, a pair of shackle links hingedly attached to and depending from said frame member, said shackle links being longitudinally spaced from said bracket, an undulated flat spring of a length greater than the length of said lever and underlying said lever in approximate spaced parallelism, one end of said spring being rigidly attached to said axle, the other end of said spring being connected with said shackle links, an angle clip fixed on said frame member and spaced from said shackle links, a spring tensioning and adjusting bolt adjustably mounted in said angle clip and operatively connected to the adjacent end of said spring for adjusting the tension of the spring.

5. The structure specified in claim 4 in conjunction with a complemental shock absorbing spring having one end attached to the projecting end of said torque lever and having the opposite end extending outwardly from said torque lever, and means adjustably anchoring the opposite end of said shock absorbing spring on said frame member.

RUDOLPH H. HELLWIG.

REFERENCES CITED

The following references are of record in the file of this patent:

UNITED STATES PATENTS

| Number | Name | Date |
|---|---|---|
| 1,173,850 | Oliver | Feb. 29, 1916 |
| 1,469,179 | Haldeman | Sept. 25, 1923 |
| 1,864,089 | Muller | June 21, 1932 |
| 2,218,634 | Best | Oct. 22, 1940 |

FOREIGN PATENTS

| Number | Country | Date |
|---|---|---|
| 12,170 | Great Britain | 1848 |
| 606,088 | France | Mar. 1, 1926 |
| 263,944 | Great Britain | Jan. 7, 1927 |